Jan. 19, 1960 W. J. STEFANEY 2,921,388
VISUAL AID EDUCATIONAL DEVICE
Filed Nov. 29, 1957
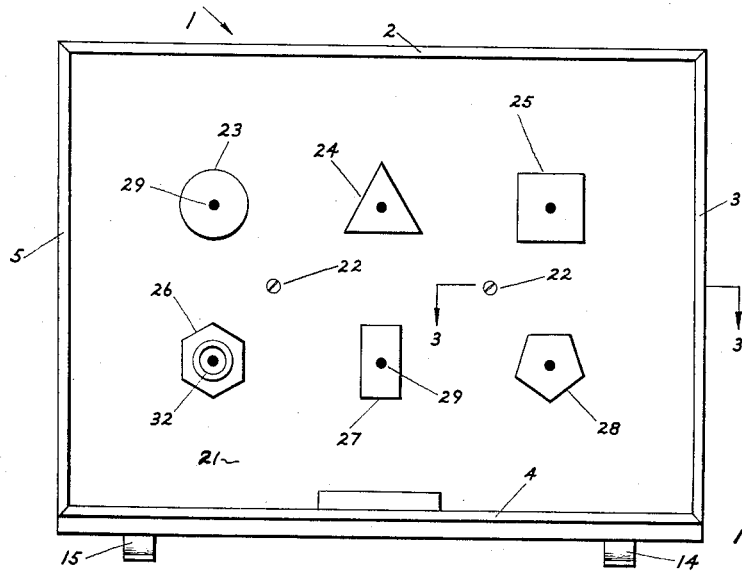
FIG.1
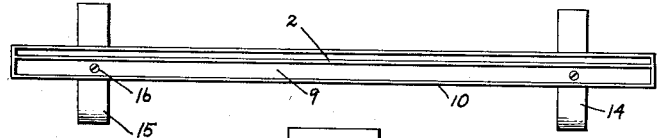
FIG.2
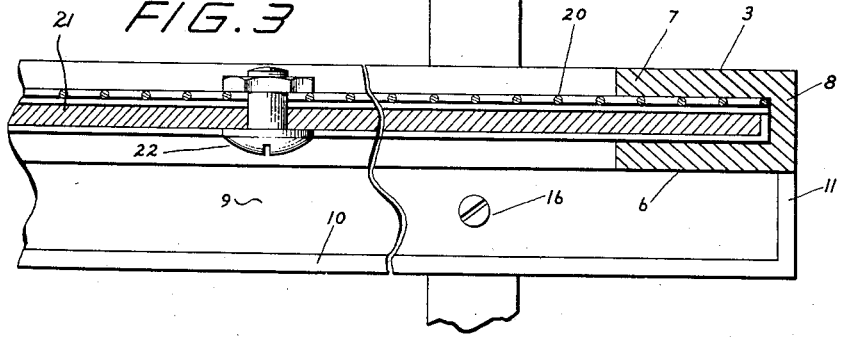
FIG.3
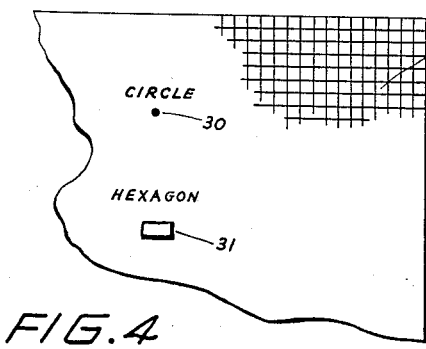
FIG.4
FIG.5
INVENTOR.
William J. Stefaney
BY Ezekiel Wolf
his Attorney

United States Patent Office

2,921,388
Patented Jan. 19, 1960

2,921,388

VISUAL AID EDUCATIONAL DEVICE

William Joseph Stefaney, Jamaica Plain, Mass.

Application November 29, 1957, Serial No. 699,708

5 Claims. (Cl. 35—73)

The present invention relates to a visual aid educational device, particularly adapted for use in a classroom or in similar situations.

Current theories of education stress the use of visual aid as supplement in the educational process. While many varieties of such aids have been devised with varying degrees of success, many of these aids are lacking in overall appeal to students of all ages. This lack of appeal is due in part, perhaps, to the failure of the aids to provide a means in which the students take an active and participant part in the educational process. Other aids are wanting in that they do not present any game-like challenge to the student, to hold his or her interest. Other aids are severely limited in their use to particular areas of education, while still other aids lack actual visual interest. In addition, many aids are severely limited not only in the areas of particular use but also in the variety of problems and situations which may be considered in any one particular field.

Moreover, it may be noted that many visual aid devices heretofore known are cumbersome in appearance and expensive in manufacture while others required elaborate electrical wiring or were battery operated.

The present invention is designed to overcome these objections of visual aid devices heretofore encountered. In the present invention, there is provided a sheet on which any number of different configurations, questions or designs of various types may be imprinted, with answers, selections or solutions corresponding to each particular configuration being printed on the reverse side in locations corresponding to the configurations to which they refer on the other side. Thus, for example, there may be produced a sheet having the map of the United States with the individual States being identified on the reverse side in locations corresponding to their position on the unlabelled map on the first mentioned side. Similarly, other configurations of various animals, questions having several possible answers or other material may be imprinted.

The sheets thus designed are secured in juxtaposition to a ferromagnetic screen, the sheets being formed of a diamagnetic material. A magnet may be secured to the screen over an identifying label as, for example, the name of a particular State. This magnet should have sufficient magnetic flux to secure a button of ferromagnetic material positioned on the opposite side of the sheet diametrically opposite to the magnet.

By this type of structure there is provided a visual aid device in which an instructor, selecting from any one of a number of different cards or sheets covering any number of subjects, is able to teach a body of grade school children in a manner in which the children's attention is consistently retained because of the active participation necessary on their parts. It is obvious that this particular device may be used in a variety of different manners which include as, for example, the use of the structure as a game in which the winner is the individual who is most successful in selecting locations for the button in which the button will remain fixed to the sheet.

These and other objects and advantages of the present invention will be more clearly understood when considered in connection with the accompanying drawings which disclose suggested embodiments of the present invention. In the drawings Figure 1 is a front plan view of the invention, Figure 2 is a top plan view of the invention, Figure 3 is a fragmentary cross sectional detail taken along the line 3—3 of Figure 1, Figure 4 is a fragmentary plan view looking from the other side of the device, as shown in Figure 1, and Figure 5 is a fragmentary plan view of a modification of a portion of the invention.

Referring to the drawings and to the first modification of the invention as shown in Figure 1, there is illustrated a rectangular frame 1 having sides 2, 3, 4 and 5, continuous with one another. Each of these sides with the exception of side 2 has a cross section such as shown in Figure 3 and providing front and rear walls 6 and 7, respectively, interconnected by an end wall 8, thereby forming a channel which faces inwardly of the frame. The upper side 2 is similar to the other sides with the exception that there is provided a longitudinal slot extending the length of the wall 8 which opens into the channel formed between the walls 6 and 7, thereby providing means by which sheets, hereinafter described, may be positioned and secured within the frame. If desired, a tray may be secured to the front of side 4. This tray comprises a bottom 9, extending longitudinally to the side 4 at the lower edge thereof and a forward retaining wall 10 extending upwardly from the front edge of the wall 9. End pieces 11 may be provided at either end of the wall 10, extending to the forward face of side 4.

A pair of legs 14 and 15 support the frame. These legs, preferably rectangular in shape as illustrated, are secured to the bottom of the frame by means of nuts and bolts indicated at 16 which project through each leg and pivotally secure them to the member 9, so that the legs may be turned from a position of longitudinal alignment with the side 4 to a position normal to this side.

A wire mesh screen of ferromagnetic material, such as iron, is secured across the opening formed by the frame 1. This screen 20 is secured at its periphery by any suitable means, such as cement or nails or staples, to the frame, preferably continuously about the surface of the wall 7 which faces and forms a part of the previously mentioned channel. This screen should be secured in position as tightly as possible with as little slack as the construction will allow.

A sheet 21 of diamagnetic material is secured within the channel. This sheet 21 has a width sufficient to position its opposite side edges in the channels formed by sides 3 and 5, and its upper and lower edges within the channels formed respectively by sides 2 and 4. The thickness of the sheet should be such as to permit its passage through the longitudinal slot in side 2 and its passage through the channels in the sides in juxtaposition to screen 20.

The sheet 21 is positioned as close as possible to the screen 20 to assure that this position is maintained during the use of the device. A nut and bolt arrangement indicated at 22 is utilized to secure the elements together.

The sheet 21 may be imprinted with any number of a variety of configurations, questions, statements or other writings. For expository purposes a single example is illustrated in Figure 1 wherein the front surface of sheet 21 is imprinted with a circle 23, a triangle 24, a square 25, a hexagon 26, a rectangle 27 and a pentagon 28. In each case a locating point 29 is imprinted within each of those geometric designs. On the reverse side of the sheet 21, as is illustrated in Figure 4, at a point directly opposite the geometric configuration, there is an identification of that particular configuration together with a locating point 30 directly opposite point 29.

In the operation of this device one individual places a magnet 31 over a point 30 of any desired geometric configuration. A second individual, as for example, in this case, a child places a button 32, made of ferromagnetic material, over the spot 29 contained within the hexagon. If desired, the button 32 may be annular in shape for ease in locating point 29. If the child is correct in placing the button 32 over the right locating point 29, it will remain in place, held there by the magnetic flux attraction of the magnet 31 on the reverse side of the sheet 21. In this connection it should be noted that the wire mesh screen 20 should have a sufficiently close weave as to support the magnet 31 when placed against it. The weave however should not be so close as to obscure the printing which appears on the rear surface of the sheet 21.

As indicated above, various sheets may be provided having a wide range of subject matters printed upon them. Thus, for example, a map of the United States may be printed on one side with the names of cities or States on the other. A sheet may be provided having animals, birds, famous individuals, etc. So too, it is possible to utilize this invention for the purpose of testing and demonstrating knowledge in the field of arithmetic or grammar as will appear from a consideration of the potential scope of the present invention.

In Figure 5 there is shown a modification of the invention in which the sheet 20 is replaced by a sheet 38 of diamagnetic material, such as paperboard or cardboard, on the rear surface of which there is laminated in a permanent arrangement a grid network 39 of ferromagnetic material, such as iron. With this particular modification the screen 20 may be entirely eliminated from the construction of the frame, together with the bolt arrangement 22.

It should be understood that the present invention is not restricted in use to classroom visual educational aids but may be embodied in games, educational home toys, physical and occupational therapy devices, for all age groups in such fields as business, military, medicine and occupational therapy.

Having now described my invention, I claim:

1. A visual aid educational device comprising a diamagnetic sheet having means forming configurations of objects on one side of said sheet, a ferromagnetic mesh, means for securing said mesh close to the other side of said sheet, a magnet adapted to be secured to said mesh opposite one of said objects, and a button of ferromagnetic material adapted to be positioned directly opposite said magnet, said magnet and button adapted to be secured in position only by the flux of said magnet.

2. A visual aid educational device comprising a diamagnetic sheet having means forming configurations of objects on one side of said sheet, and on the other side directly opposite each of said objects an identifying means for said object, a ferromagnetic mesh, means for securing said mesh close to said other side, a magnet adapted to be removably secured by flux to said mesh opposite any one of said objects, and a button of ferromagnetic material adapted to be positioned opposite said magnet and be secured against said sheet only in said position by the flux of said magnet.

3. A visual aid educational device comprising a frame, a diamagnetic sheet having means forming configurations of objects on one side of said sheet adapted to be removably secured across said frame, a ferromagnetic mesh secured across said frame and adapted to be positioned in juxtaposition to the other side of said sheet, a magnet adapted to be secured by flux to said mesh opposite any one of said objects, and a button of ferromagnetic material adapted to be positioned opposite said magnet and be secured against said sheet by the flux of said magnet.

4. A device as set forth in claim 3 wherein said frame is rectangular with channels formed in the sides thereof, said mesh extending from one side to the other, and with said sheet adapted to be removably positioned in said channels.

5. A device as set forth in claim 1 wherein said sheet and mesh are laminated together.

References Cited in the file of this patent

UNITED STATES PATENTS

| | | |
|---|---|---|
| 1,168,949 | McKittrick et al. | Jan. 18, 1916 |
| 1,516,264 | Bliss | Nov. 18, 1924 |
| 2,254,810 | Will | Sept. 2, 1941 |
| 2,595,833 | Flaherty | May 6, 1952 |